United States Patent
Maillard et al.

(10) Patent No.: US 11,068,086 B2
(45) Date of Patent: Jul. 20, 2021

(54) IMPACT-RESISTANT TERMINAL, IN PARTICULAR AN ACCESS CONTROL TERMINAL

(71) Applicant: IDEMIA IDENTITY & SECURITY FRANCE, Issy les Moulineaux (FR)

(72) Inventors: Sylvain Maillard, Issy les Moulineaux (FR); Melaine Antoine Julou, Issy les Moulineaux (FR)

(73) Assignee: IDEMIA IDENTITY & SECURITY FRANCE, Courbevoie (FR)

( * ) Notice: Subject to any disclaimer, the term of this patent is extended or adjusted under 35 U.S.C. 154(b) by 0 days.

(21) Appl. No.: 16/140,445

(22) Filed: Sep. 24, 2018

(65) Prior Publication Data
US 2019/0094999 A1    Mar. 28, 2019

(30) Foreign Application Priority Data

Sep. 25, 2017   (FR) ...................................... 1758844

(51) Int. Cl.
| | |
|---|---|
| *G06F 3/041* | (2006.01) |
| *G06F 1/16* | (2006.01) |
| *G06F 1/18* | (2006.01) |
| *G06F 21/32* | (2013.01) |
| *G06K 9/00* | (2006.01) |

(52) U.S. Cl.
CPC ............ *G06F 3/041* (2013.01); *G06F 1/1643* (2013.01); *G06F 1/1656* (2013.01); *G06F 1/182* (2013.01); *G06F 21/32* (2013.01); *G06K 9/00013* (2013.01); *G06F 2203/04103* (2013.01)

(58) Field of Classification Search
CPC ...... G06F 3/041; G06F 21/32; G06K 9/00013
See application file for complete search history.

(56) References Cited

U.S. PATENT DOCUMENTS

| | | | |
|---|---|---|---|
| 2003/0184514 A1* | 10/2003 | Grosfeld ................. | G06F 3/041 345/156 |
| 2006/0146039 A1* | 7/2006 | Prados .................... | G06F 3/016 345/173 |

(Continued)

FOREIGN PATENT DOCUMENTS

| | | | |
|---|---|---|---|
| JP | 2000-276254 A | | 10/2000 |
| JP | 2000276254 A | * | 10/2000 |

OTHER PUBLICATIONS

Preliminary Research Report received for French Application No. 1758844, dated Jun. 20, 2018, 3 pages (1 page of French Translation Cover Sheet and 2 pages of original document).

*Primary Examiner* — Alexander Eisen
*Assistant Examiner* — Cory A Almeida
(74) *Attorney, Agent, or Firm* — Womble Bond Dickinson (US) LLP

(57) ABSTRACT

The present invention concerns a terminal (1) comprising a frame (10), a touchscreen (11), a glass panel (12) protecting the touchscreen (11), an outer shell (13), characterized in that successively gripped between the frame (10) and the shell (13) there are:
  a first seal (14*a*),
  a peripheral region (120) of the glass panel (12), and
  a second seal (14*b*);
and in that the touchscreen (11) is arranged between a central portion (121) of the glass panel (12) and the frame (10), the touchscreen (11) being secured to only one from among the frame (10) and the glass panel (12).
The present invention also concerns a process for manufacturing the terminal.

13 Claims, 3 Drawing Sheets

(56) References Cited

U.S. PATENT DOCUMENTS

2012/0281381 A1* 11/2012 Sanford ................ G06F 1/1626
    361/807
2015/0145783 A1* 5/2015 Redelsheimer ......... G06F 3/016
    345/173
2015/0378483 A1* 12/2015 Tachikawa ............ G01L 1/2262
    345/174

* cited by examiner

IMPACT-RESISTANT TERMINAL, IN PARTICULAR AN ACCESS CONTROL TERMINAL

GENERAL TECHNICAL FIELD

The present invention is directed towards the field of rugged terminals, in particular biometric access control terminals.

STATE OF THE ART

Access control terminals are known such as the models in the MorphoAccess® family by SIGMA.

These terminals, equipped with a touchscreen and one or more biometric feature sensors (fingerprint or palm print scanner, camera for facial or iris recognition, etc.) are capable of referencing then of identifying individuals, and of triggering actions as a function of the result of this identification e.g. the opening of a door if the identified individual has right of access.

They are found for example at the entrance to company head offices, sensitive infrastructures such as ports and airports, government buildings, laboratories, military buildings, financial institutions and more simply on the door of secure premises such as IT rooms or vaults.

Such equipment proves to be most satisfactory in terms of security and ease of use, but it is ascertained that they are fragile and sensitive to the environment. In particular, they are not vandal resistant.

They effectively comprise a fragile component which is a touch display (covering the screen) that is difficult to protect and which up until now has generally confined said access control terminals inside offices, whereas it would be desirable to be able to use these under difficult conditions such as an industrial environment (workshop, factory, mine etc.), outdoors (severe weather conditions) and in general in contact with the public which may possibly be ill-intentioned.

The touch display is usually combined with a glass panel on the surface thereof, thereby providing a seal and some resistance to attack. The so-called «extreme» versions of existing terminals are IP65 rated in accordance with standard EN 60529, which indicates total protection against ingress of dust and protection against water jets from any direction projected by a hose (nozzle of 6.3 mm, distance 2.5 m to 3 m, flow rate 12.5 l/min±5%).

Similarly, it would be desirable to obtain resistance to all involuntary and even voluntary impacts (hammer attack). This would require IK09 rating and even IK10 rating in accordance with standard EN 62262, i.e. resistance to repeated impacting of 10J (20J for IK10), which corresponds to a 500 g steel ball being dropped from several metres. In addition, IP65 sealing must be maintained despite recoil of the screen at the time of impact.

However, the size of touch displays in these terminals is too large for the glass to be able to absorb such impact. More specifically, despite large thickness and the use of excellent materials in said «extreme» models, under repeated impacting of several joules the glass panel will deform and systematically destroy the touch display.

The first solution to this problem is quite simply to reduce the size of the screen, and hence the size of the display and glass panel to increase the rigidity of the latter. Said solution cannot be envisaged since it would be strongly detrimental to user-friendliness of the terminals.

The second solution is to increase the rigidity of the structure either via strong clamping/gluing of the display to the glass panel or by increasing glass thickness. Said solution works but remains limited since the end result is loss of sensitivity of the touchscreen.

It would therefore be desirable to have available a novel structure for the touchscreen of an access control terminal, which meets criteria of ruggedness and sealing without reducing the secureness, sensitivity or even ease of assembly thereof.

SUMMARY OF THE INVENTION

In a first aspect, the present invention concerns a terminal comprising a frame, a touchscreen, a glass panel protecting the touchscreen, an outer shell, characterized in that successively gripped between the frame and the shell there are:
  a first seal;
  a peripheral region of the glass panel; and
  a second seal;
and in that the touchscreen is arranged between a central portion of the glass panel and the frame, the touchscreen being secured to only one from among the frame and glass panel.

According to other advantageous, nonlimiting characteristics:
  the touchscreen is secured to the glass panel but not to the frame;
  flexible foam supports are gripped between the touchscreen and the frame;
  the first seal has a Shore A hardness at least twice, preferably at least four times the Shore A hardness of the second seal;
  the first seal is in polyurethane foam or hard silicone;
  the second seal is in silicone foam or soft silicone;
  the frame and/or the shell is in a material selected from among acrylonitrile butadiene styrene, polycarbonate or a mixture of acrylonitrile butadiene styrene and polycarbonate;
  the glass panel has a thickness of between 3 and 6 mm;
  the glass panel is in contact neither with the frame nor with the shell;
  the touchscreen comprises a screen covered by a touch display and arranged in a casing, and is IK08 rated in accordance with standard EN 62262;
  the terminal is adapted for access control, and further comprises data processing means and at least one biometric feature sensor;
  the shell is secured to the frame;
  the frame comprises one or more hooks extending between the peripheral region of the glass panel and the shell.

In a second aspect, the present invention concerns a process for manufacturing a terminal according to the first aspect, characterized in that it comprises implementing steps of:
  (a) mounting the touchscreen on the frame;
  (b) above the touchscreen, pressing the glass panel against the first seal until the glass panel is held in position by the hook(s);
  (c) above the glass panel, pressing the shell against the second seal.

PRESENTATION OF THE FIGURES

Other characteristics and advantages of the present invention will become apparent on reading the following description of a preferred embodiment. This description is given with reference to the appended drawings in which:

FIG. 1 generally illustrates one embodiment of the terminal of the invention;

DETAILED DESCRIPTION

Architecture

Figure 1:
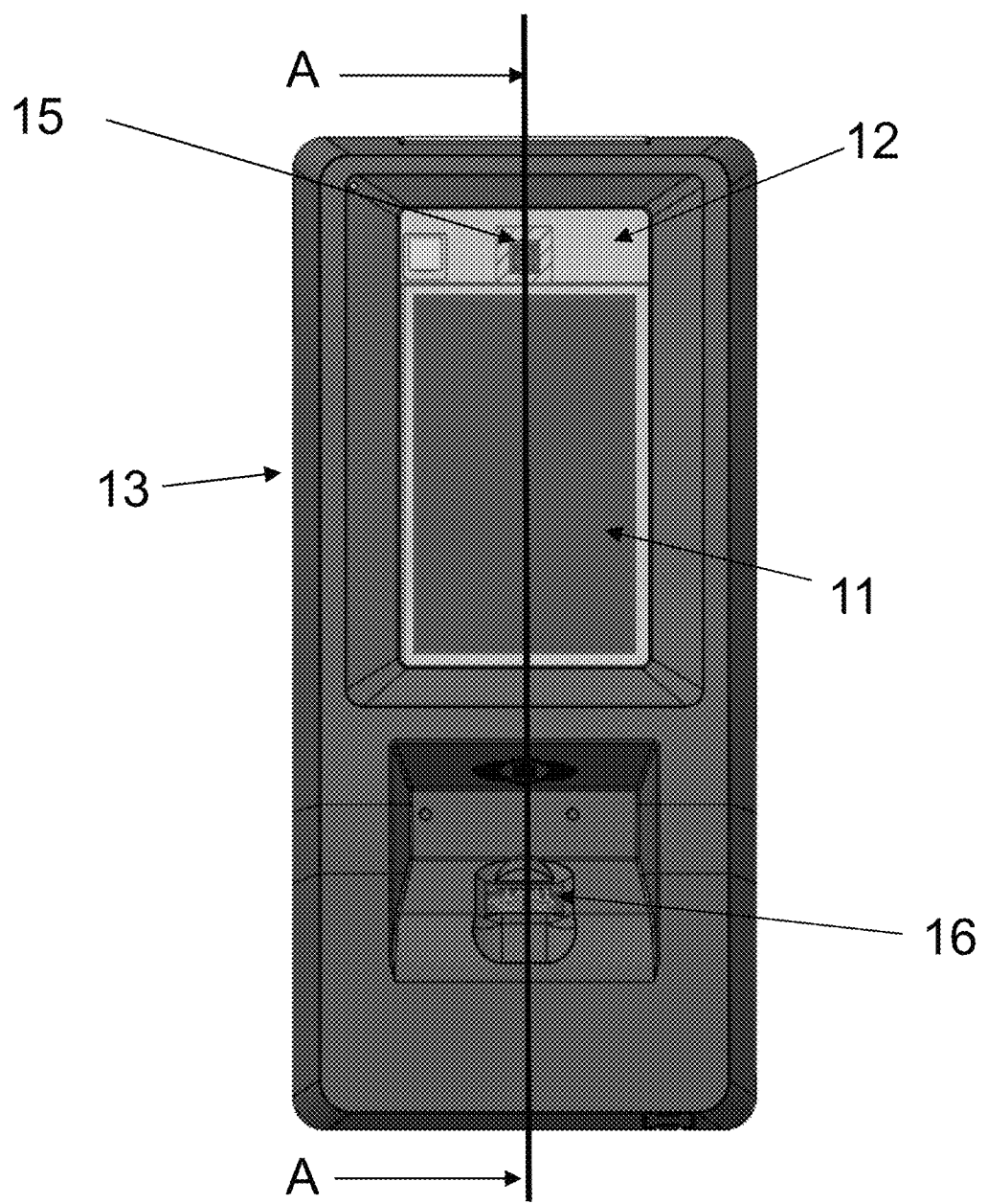

With reference to FIG. 1, there is proposed a terminal 1 of access control terminal type. This terminal 1 comprises a frame 10 (not visible in FIG. 1 since it is inside), a touchscreen 11, a glass panel 12 protecting at least the touchscreen 11 (the glass panel 12 is not thickened compared with the prior art so as not to reduce touch sensitivity, and typically has a thickness of between 3 and 6 mm, e.g. between 3.5 and 5 mm), and an outer shell 13 surrounding the frame 10 and forming a protective casing for the terminal 1.

In the remainder of the present description, the example will be taken of an access control terminal 1. In general, the present invention can be applied to any terminal equipped with a large touchscreen to be protected, e.g. a cash dispenser, terminal for the purchase of transport tickets, a validator, etc. It is within the reach of persons skilled in the art to transpose.

The access control terminal 1 in FIG. 1 in this respect comprises data processing means (not illustrated) arranged within the frame 10 to implement access control as a function of received data. For this purpose, it may be connected to a mechanical actuator such as a bolt or barrier to allow a user physical access if granted.

The terminal 1 is preferably biometric i.e. it comprises at least one biometric feature sensor 15, 16. The example of a terminal shown in the Figures therefore has a camera 15 (arranged in the vicinity of the touchscreen 11 and also protected by the glass panel 12) and a fingerprint sensor 16.

Skilled person can therefore use any biometric feature sensor and implement any known technique for biometric identification or authentication.

Mounting of the Glass Panel

In the remainder of the description, a direction D is determined from inside to outside the terminal along an axis orthogonal to the surface of the touchscreen 11.

Figure 2:
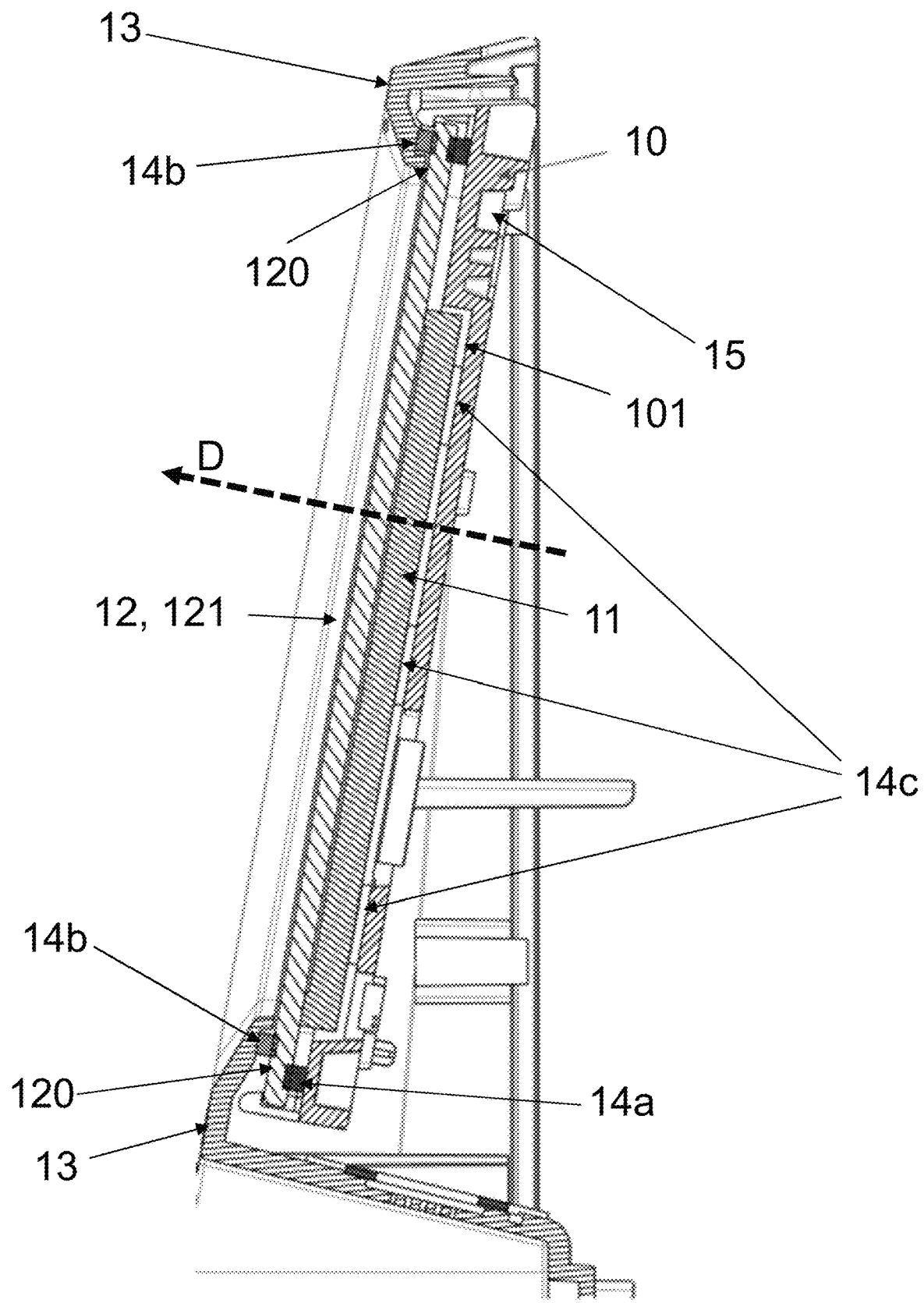
FIG. 2 is a detail of a cross-section along the vertical plane of the upper part of the terminal in FIG. 1.

This direction is indicated by the arrow in FIG. 2 representing a cross-section of the upper part of the terminal 1 (as far as the fingerprint sensor 16) along the vertical plane AA visible in FIG. 1.

Figure 3:
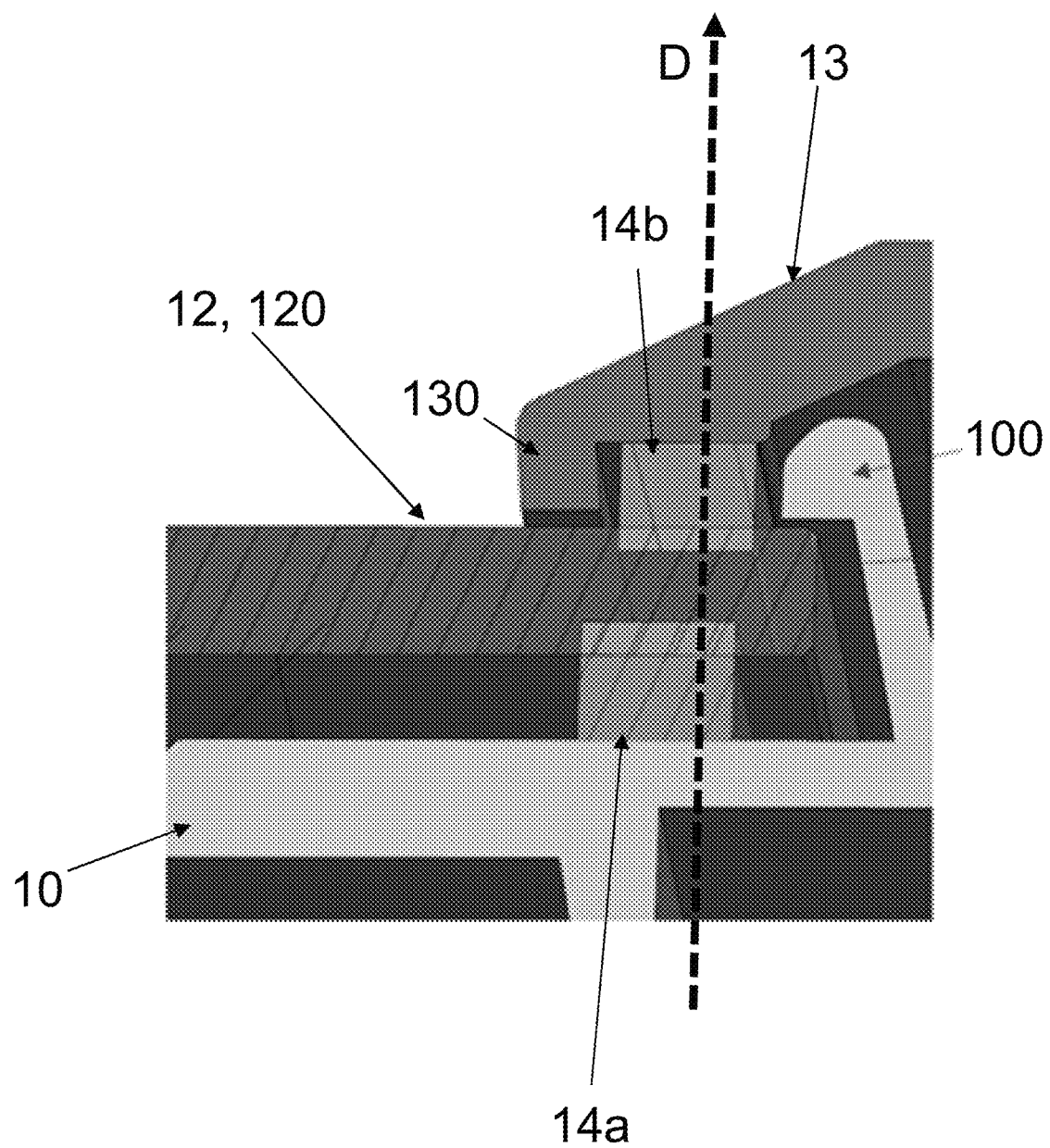
FIG. 3 is a detail of FIG. 2 at one edge of a glass panel of the terminal.

The terminal 1 is therefore such that the following are successively gripped between the frame 10 and the shell 13 (in said direction D):

a first seal 14a (seal between the frame 10 and glass panel 12), a peripheral region 120 of the glass panel 12, and a second seal 14b (seal between the glass panel 12 and the shell 13). This is particularly visible in FIG. 3 illustrating a detail of the structure at the peripheral region 120.

By gripping it is meant that the assembly is pressed i.e. the seals 14a, 14b are compressed. The shell 13 is preferably secured to the frame 10 (e.g. via screws), in particular outside the glass panel 12 to maintain this compression.

In other words, it is a sandwich structure comprising in order (and exclusively) the frame 10, the first seal 14a, the glass panel 12, the second seal 14b, the shell 13.

It can be seen that this sandwich structure does not incorporate the touchscreen 11 itself. As will be seen below, the touchscreen 11 is arranged between a central portion 121 of the glass panel 12 and the frame 10, preferably in a cavity 101 of the frame 10.

The shell 13 therefore only covers the peripheral region 120 i.e. a strip having a width of a few millimetres to a few centimetres on the edge of the glass panel 12), but not the central portion 121 through which the touchscreen 11 can be seen. The seals 14a, 14b are therefore arranged along the edges of the glass panel 12. If the glass panel 12 is of rectangular shape, the seals 14a, 14b form a closed rectangular «surround» (i.e. forming a loop).

Screen Support

The touchscreen 11 is a commercial touchscreen for example comprising a (single) screen covered by a touch display and arranged in a casing, preferably already IK08 rated in accordance with standard EN 62262.

As will be seen, this present mounting allows a touchscreen 11 initially IK08 designed to made resistant to IK09 and even IK10 impacts.

In particular, the touchscreen 11 is secured to only one from among the frame 10 and glass panel 12, preferably to the glass panel 12 but not to the frame 10 (e.g. it is clamped or glued and/or adhesively attached to the glass panel 12. The objective of said «floating» assembly of the touchscreen 11 and glass panel 12 is that the energy of a mechanical impact on the glass panel 12 is essentially transmitted to the frame 10 via an absorbent element 14a and not to the screen 11.

Preferably, supports in flexible foam 14c of spacer type are gripped between the touchscreen 11 and the frame 10 (advantageously at the bottom of the cavity 101).

Therefore, even if a strong impact should cause deformation of the glass panel 12 to the extent that it presses on the touchscreen 11, the latter would recoil compressing the foam supports 14c instead of becoming itself deformed.

Materials

For maximum amortization of impacts on the screen, preferably different materials are chosen, selected from among elastomers for the first and second seal 14a, 14b.

The two seals do not have the same function: the first seal 14a (glass panel/frame seal) is the one which ensures absorption and restitution of impact energy, high hardness being required, whereas the second seal (glass panel/shell seal) ensures imperviousness and on the contrary requires low hardness and near-zero resilience to maintain sealing even in the event of recoil of the glass panel 12 at the time of impact.

Therefore, the first seal 14a is selected from a much harder material than the second seal 14b. In particular, the first seal 14a advantageously has a Shore hardness at least twice, and even at least four times even six times the Shore hardness of the second seal 14b.

Said difference in hardness additionally has the advantage of contributing towards controlling the compression of the second seal 14b which ensures imperviousness.

Preferably, the first seal 14a has a hardness of between 40 Shore A and 60 Shore A in particular close to 60 Shore A (a polyurethane foam is particularly used of Poron type for example, or a hard silicone e.g. of low-resilience kSil GP 40 type). Shore A hardness conforms to standards ISO 868 and 7619, ASTM D 2240 and DIN 53505.

Regarding the second seal 14b, the hardness thereof is preferably between 10 Shore A and 30 Shore A.

According to a first embodiment, mounting is carried out using a press and a material can be chosen having a hardness of between 20 Shore A and 30 Shore A, in particular a soft silicone e.g. of type kSil GT21 type.

According to a second preferred embodiment, mounting is carried out without a press (i.e. manually) and a material can be chosen having a hardness of between 10 Shore A and 20 Shore A, in particular close to 10 Shore A, in particular a silicone foam e.g. of Rodgers HT800 type.

All these materials of the seals 14a, 14b withstand a temperature above 85° C.

Regarding the frame 10 and the shell 13, these are advantageously in a material resistant to impact, to UV, fire, temperature, etc. The material is particularly selected from among acrylonitrile butadiene styrene (ABS), polycarbonate (PC), or a mixture of both (ABS/PC), and preferably the latter.

Therefore, for the frame 10, ABS/PC FR3010 is an example of an excellent compromise. Alternatively, Lexan-type PC is suitable. For the shell 13, UV-compatible PCs are adapted.

Other Improvements

With reference to FIG. 3, the frame 10 advantageously comprises one or more hooks 100 extending between the peripheral region 120 of the glass panel 12 and the shell 13.

In other words, these hooks 100 extend from the frame 10, pass the first seal 14a and the glass panel 12 and hook between the glass panel 12 and the shell at the second seal 14b.

The positioning of the glass panel 12 over the touchscreen 11 requires deformation of these hooks 100 so as to hook the glass panel 12 onto the frame 10. This largely facilitates assembly since it prevents the glass panel 12 from falling when placing the shell 13 in position.

Therefore, when assembling the terminal 10, there is another temporary sandwich structure when the following are successively gripped between the frame 10 and the hooks 100 (in said aforementioned direction):
the first seal 14a (seal between the frame 10 and the glass panel (12); and
the peripheral region 120 of the glass panel 12.

Also, preferably, the glass panel 12 is in contact neither with the frame 10 nor with the shell 13. In other words, it is only secured by the seals 14a, 14. This makes possible that forces are never induced at the corners of the glass panel which, together with the centre, belong to the most fragile parts.

It was ascertained that in some cases it is not so much the impact of a hammer on the glass 12 which causes breaking thereof, but the impacting of the glass panel 12 on the frame 10 or shell 13.

Said structure in fine leads to the glass panel 12 being more likely to move under an impact than when it is secured to the frame 10 or to the shell 13, but in combination with the foam 14c supporting the touchscreen 11 this does not give rise to any problem. To summarize, the glass panel simply breaks less easily.

It is to be noted, as can be seen in FIG. 3, that this is not incompatible with the presence of the hooks 100. The latter are only in contact with the glass panel 12 for as long as the assembly is not pressed together. More specifically, when the shell 12 is positioned on the glass panel and force is applied to the assembly, the first and second seals 14a, 14b are compressed and their thickness is reduced. The glass panel 12 then moves away from the hooks 100 and there is no longer any risk that they will damage a corner or edge at the time of an impact.

Skilled persons are able to choose the proper dimensions of the hooks 100 as a function of the materials of the seals 14a, 14b and the desired compression thereof.

Finally, it is observed in FIG. 3 that the shell 13 may comprise a protruding edge 130 extending towards the glass panel 12 (i.e. from outside to inside) along the second seal 14b. This protruding edge 130 reduces the gap between the glass panel 12 and the shell 13 and increases imperviousness (it protects and allows the second seal 14b to be less exposed to the environment).

The length thereof is chosen to be shorter than the thickness of the compressed second seal 14b, to leave an interstice 131 and prevent contact between the glass panel 12 and the shell as previously provided.

Terminal Manufacturing Process

In a second aspect, the invention concerns the process for manufacturing the terminal 1 according to the first aspect i.e. the assembling of the parts to arrive at the state illustrated in the Figures.

In the preferred embodiment in which the frame 10 comprises hooks 100, this process comprises the following steps:
(a) mounting the touchscreen 11 on the frame 10 (typically in the cavity 101 after placing in position the foam supports 14c);
(b) above the touchscreen 11, pressing (manually or using a press) the glass panel 12 against the first seal 14a until the glass panel 12 is held in place by the hook(s) 100 (i.e. slight deforming of the first seal 14a and hooking);
(c) above the glass panel 12, pressing the shell 13 (also manually or using a press) against the second seal 14b (deforming of the second seal and additional deforming of the first seal 14a until there is no longer any contact between the glass panel 12 and the hooks 100).

The shell 13 can then be secured to the frame 10 to lock the assembly together.

The presence of the hooks 100 provides a pause between steps (b) and (c). If no hooks, steps (b) and (c) must be performed simultaneously.

The invention claimed is:

1. A terminal comprising a frame, a touchscreen, a glass panel protecting the touchscreen, an outer shell, characterized in that successively gripped between the frame and the shell there are:
a first seal,
a peripheral region of the glass panel, and
a second seal;
and in that the touchscreen is arranged between a central portion of the glass panel and the frame, the touchscreen being secured to only one from among the frame and the glass panel,
wherein the frame comprises one or more hooks extending from the frame, passing the first seal and the glass panel and hooking between the glass panel and the shell at the second seal between the peripheral region of the glass panel and the shell.

2. The terminal according to claim 1 wherein the touchscreen is secured to the glass panel but not to the frame.

3. The terminal according to claim 2, wherein flexible foam supports are gripped between the touchscreen and the frame.

4. The terminal according to claim 1, wherein the first seal has a Shore A hardness at least twice, preferably at least four times the Shore A hardness of the second seal.

5. The terminal according to claim 1, wherein the first seal is in polyurethane foam or hard silicone.

6. The terminal according to claim 1, wherein the second seal is in silicone foam or soft silicone.

7. The terminal according to claim 1, wherein the frame and/or the shell is in a material selected from among acrylonitrile butadiene styrene, polycarbonate, and a mixture of acrylonitrile butadiene styrene and polycarbonate.

8. The terminal according to claim 1, wherein the glass panel has a thickness of between 3 and 6 mm.

9. The terminal according to claim 1, wherein the glass panel is in contact neither with the frame nor with the shell.

10. The terminal according to claim 1, wherein the touchscreen comprises a screen covered by a touch display and arranged in a casing, and is IK08 rated in accordance with standard EN 62262.

11. The terminal according to claim 1, adapted for access control, further comprising data processing means and at least one biometric feature sensor.

12. The terminal according to claim 1, wherein the shell is secured to the frame.

13. Process for manufacturing a terminal according to claim 12, comprising steps of:
   (a) mounting the touchscreen on the frame;
   (b) above the touchscreen, pressing the glass panel against the first seal until the glass panel is held in position by the hook(s);
above the glass panel, pressing the shell against the second seal.

* * * * *